(12) United States Patent
Craig

(10) Patent No.: US 6,773,209 B2
(45) Date of Patent: Aug. 10, 2004

(54) HELICAL INSERT AND CUTTER BODIES

(75) Inventor: Karen A. Craig, Ligonier, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 10/160,488

(22) Filed: May 31, 2002

(65) Prior Publication Data

US 2003/0223829 A1 Dec. 4, 2003

(51) Int. Cl.$^7$ .............................. B26D 1/12; B23P 15/28
(52) U.S. Cl. ............................ 407/63; 407/40; 407/48; 407/113
(58) Field of Search .............................. 407/34, 35, 40, 407/42, 43, 48, 56, 61, 62, 63, 113

(56) References Cited

U.S. PATENT DOCUMENTS

| | | | |
|---|---|---|---|
| 3,715,788 A | * 2/1973 | Ayer | 407/37 |
| 3,861,011 A | * 1/1975 | Nose et al. | 407/11 |
| 4,618,296 A | * 10/1986 | Allaire et al. | 407/42 |
| 4,714,383 A | * 12/1987 | Shimomura et al. | 407/42 |
| 4,790,693 A | 12/1988 | Koblesky | 407/35 |
| 4,812,087 A | 3/1989 | Stashko | 407/42 |
| 4,838,739 A | * 6/1989 | Stashko | 407/42 |
| 4,898,500 A | * 2/1990 | Nakamura et al. | 407/62 |
| 4,936,361 A | * 6/1990 | Mercier et al. | 144/221 |
| 5,083,887 A | * 1/1992 | Dotany | 407/59 |
| 5,244,318 A | * 9/1993 | Arai et al. | 407/42 |
| 5,272,940 A | * 12/1993 | Diskin | 76/108.6 |
| 5,586,843 A | 12/1996 | Minicozzi | 407/42 |
| 5,913,644 A | 6/1999 | DeRoche et al. | 407/42 |
| 5,944,456 A | 8/1999 | Shirley et al. | 407/42 |
| 5,947,650 A | 9/1999 | Satran et al. | 407/113 |
| 6,053,672 A | 4/2000 | Satran et al. | 407/40 |
| 6,171,031 B1 | * 1/2001 | LaFlamme | 407/113 |
| 6,196,770 B1 | 3/2001 | Astrom et al. | 407/40 |
| 6,224,299 B1 | * 5/2001 | Frecska et al. | 407/41 |

* cited by examiner

Primary Examiner—A. L. Wellington
Assistant Examiner—Brian D. Walsh
(74) Attorney, Agent, or Firm—Larry R. Meenan

(57) ABSTRACT

A cutter system that is designed to create a continuous cutting true helix while having cutting inserts that are indexable on at least two cutting edges by rotating the cutting insert. High positive radial and axial rakes enable free cutting machining with a fine finish and low horsepower consumption. The back face of the insert is substantially flat and is used for face contact on lockup with a mounting pocket on the cutter body when the insert screw is tightened. The mounting pocket is designed for ease of manufacture to limit tolerance buildup to ensure repeatable insert positioning and to maintain accuracy for a fine cutting finish. The insert screw hole is placed in the cross hole location for allowing an unobstructed cutting face and a larger diameter center core in the cutter body. The larger core creates maximum strength and allows longer cutting lengths. Prior to grinding, the insert blank can be used for multiple diameters of cutters. After grinding the insert blank, the inserts are made specific to the cutting diameter for which they were ground or a compromised grind may be employed for use with multiple cutting diameters.

16 Claims, 7 Drawing Sheets

HELICAL INSERT AND CUTTER BODIES

CROSS-NOTING TO RELATED APPLICATIONS

This application is related to U.S. application Ser. No. 10/161,489, entitled True Helical Cutter System, filed on May 31, 2002, the entire contents of which are herein incorporated by reference.

BACKGROUND OF THE INVENTION

1. Field of the Invention

The present invention relates to mill and milling cutters and cutting inserts used thereon, and in particular to a helical cutter system that includes a cutter body with indexable helical cutting inserts.

2. Description of the Related Art

Currently, the use of an indexable insert is not the first choice for small machine tools because the spindles on such small machines produce relatively lower horsepower and torque than larger machine tools. Because current cutting insert designs need more power to cut effectively, small machine tools are typically relegated to using solid end mill cutters and shell end mill cutters. However, solid end mill cutters and shell end mill cutters wear as they lose diameter, and if broken, can be entirely scraped. In addition, the limited size of the cutters that can be used with indexable insert designs may result in a loss of productivity.

The inventor of the present invention has recognized these and other problems associated with end mill cutters, such as solid end mill cutters and shell end mill cutters, which utilize a helical cutting edge geometry.

SUMMARY OF THE INVENTION

To solve these problems, the present invention provides an improved cutter body that utilizes an indexable cutting insert design that has at least two indexable cutting edges. High positive axial and radial rake angles of the improved indexable cutting insert design uses less power and torque than conventional inserts, thereby allowing smoother cutting action and increased feed rates that would have previously stalled a smaller machine tool. In addition, the cutting insert of the invention can be used in larger cutters with an increased number of cutting edges to increase productivity on both small and large machine tools. Further, the only scrap is the cutting insert and not the entire cutter body, thereby minimizing production costs as compared to conventional designs.

The present invention comprises an indexable cutting insert that includes a flat back that is held in a mounting pocket of a cutter body. The mounting pocket can be designed for ease of manufacture and repeatability. Stub length tooling may be used for rigid setups and lower cost. The cutting insert is located in the mounting pocket on two outboard walls. The cutting insert is secured to the cutter body by use of a screw in a cross hole fashion. The face of the cutting insert has a helical cutting edge on two sides and can be indexed by rotating the cutting insert approximately 180 degrees. With the use of the cutting insert of the invention, the cutter body has a maximum core diameter for strength and rigidity, thereby minimizing tool deflection and extending the life of the cutter body. The cutting insert of the invention can be used in a variety of milling cutter body designs, such as end mill cutters, shell end mill cutters, or the like.

Various aspects and advantages of this invention will become apparent to those skilled in the art from the following detailed description of the preferred embodiment, when read in light of the accompanying drawings.

DESCRIPTION OF THE PREFERRED EMBODIMENT

Figure 1:
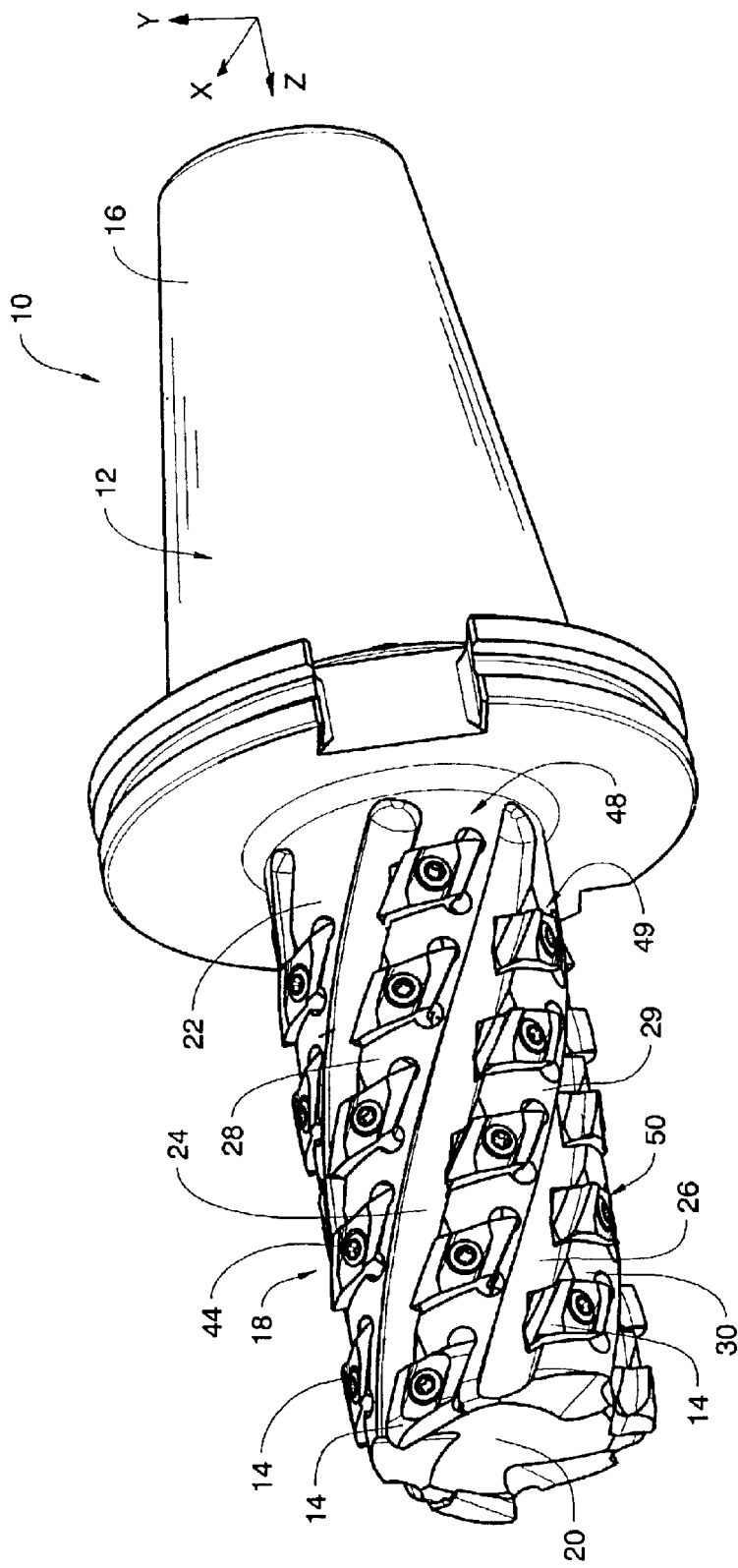
FIG. 1 is a side perspective view of a helical end mill cutter with improved cutting inserts according to an embodiment of the invention.
Figure 2:
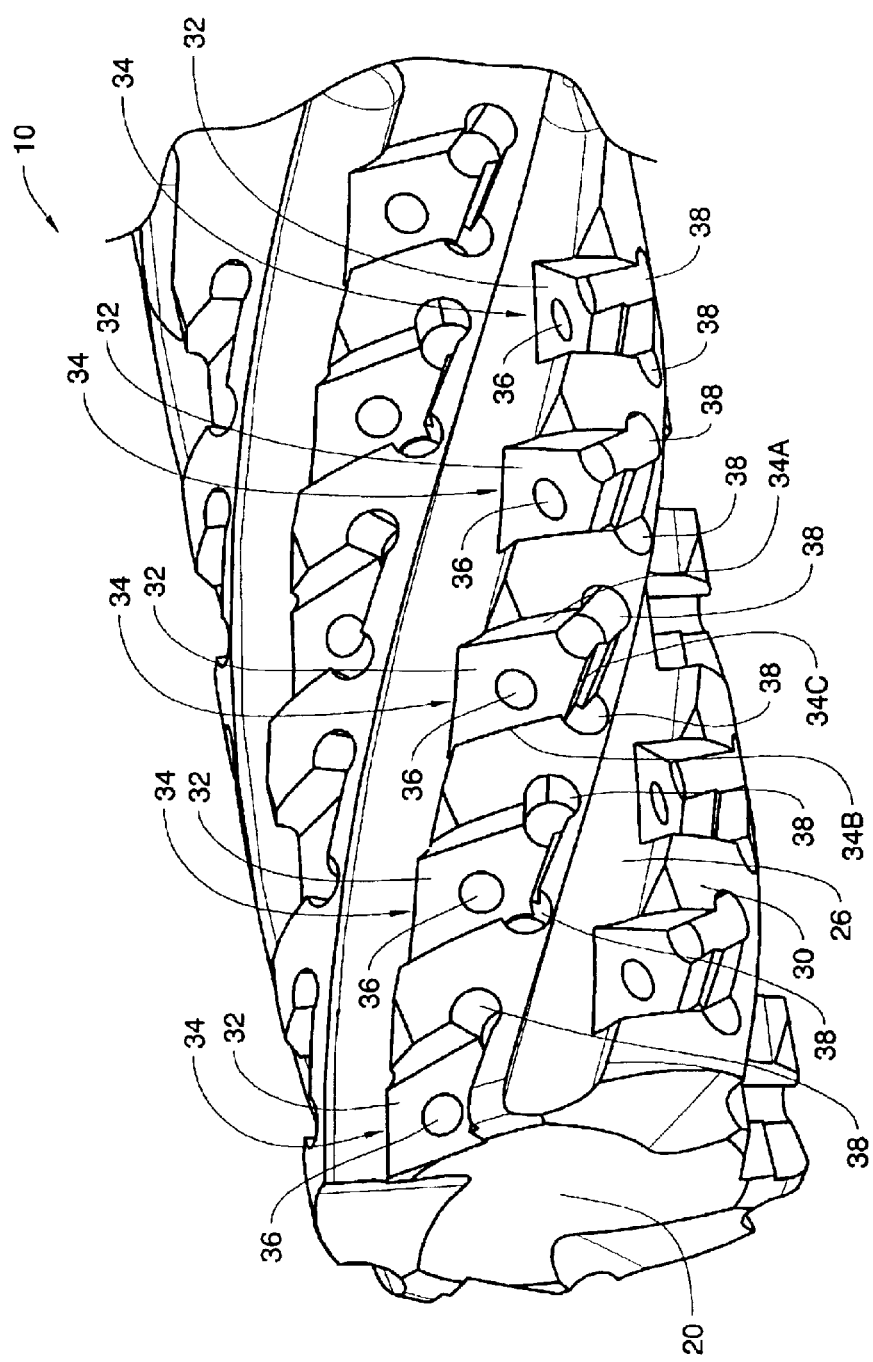
FIG. 2 is a side perspective view of the helical end mill cutter head with the cutting inserts removed.
Figure 8:
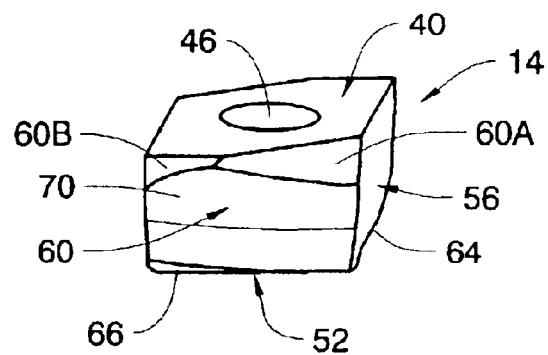
FIG. 8 is a side perspective view of the bottom of the cutting insert of FIG. 3.

Referring now to FIGS. 1 and 2, an improved cutter system, shown generally at 10, includes a milling cutter body 12 with improved cutting inserts 14 that are indexable on at least two cutting edges. The milling cutter body 12 is embodied as a helical end mill which includes the plurality of general milling inserts 14 for ramping, circle interpolating, facing and end milling. Although the improved cutting inserts 14 are shown in a helical end mill embodiment, the improved cuttings inserts 14 are designed for use in any type of milling, such as shell end milling, face milling, fly cutting, or the like. In addition, several of the concepts described below on the helical mill including overlapping inserts by offsetting, staggering or other methods are also designed for use on other types of milling cutters.

The milling cutter body 12 is of an elongated and generally cylindrical shape. The milling cutter body 12 comprises a shank 16 and a head 18. The shank 16 is configured so as to be capable of insertion and securing within the spindle of a milling machine (not shown) as is well known in the art. The shank 16 may be of any shape or design so as to be capable of this insertion and securing. Such designs include, but are not limited to, V-flange, taper, shell mill mount, and Weldon shank.

The head 18 is generally a cylindrical or substantially cylindrical body or shaft extending axially from the shank 16 to an end face 20, thereby defining an exterior surface 22 therebetween. The exterior surface 22 of the head 18 preferably includes a plurality of helical chip grooves 24 and 26. It will be appreciated that the invention is not limited by the number of helical chip grooves. For example, in the illustrated embodiment, four grooves out of a total of six grooves are shown in FIG. 1, although any number of helical grooves are contemplated by the invention. Each chip groove 24 and 26 is preferably cut into the exterior surface 22 in a helical or spiral manner that extends from the end face 20 to substantially the shank 16. Each chip groove 24 and 26 is preferably located between a carved out flute area on which a helical grouping of cutting inserts 14 can be mounted thereon. For example, in the illustrated embodiment, the chip groove 24 is preferably located between the helical grouping 48 of a flute area 28 and the helical grouping 49 of a flute area 29. Similarly, the chip groove 26 is preferably located between the helical grouping 49 of the flute area 29 and the helical grouping 49 of a flute area 30. Each flute area 28, 29 and 30 spirals along the exterior surface 22 such that any cross sectional point thereon is substantially radial to a central axis (in the direction of the z-axis) of the substantially cylindrical shank 16.

As best shown in FIG. 2, a plurality of pocket faces 32 are located along each flute area 28, 29 and 30. Each pocket face 32 includes a mounting pocket 34 with a threaded hole 36 therein. It should be noted that configuration of the mounting pocket 34 substantially conforms to the configuration of the insert 14. Thus, in the illustrated embodiment, opposed walls 34a and 34b of each mounting pocket 34 are generally parallel to each other. Each mounting pocket 34 also includes a back wall 34c to provide a three-point mounting system in which the cutting insert 14 positively engages the pocket face 32, the side wall 34a and the back wall 34c when the cutting insert 14 is positively secured within the mounting pocket 34. A relief 38 is located in one corner of each mounting pocket 34 formed by the side wall 34a and the back wall 34c to provide a locating surface and prevent the insert 14 from binding with the cutter head 18. If desirable, another relief 38 can be located in the other corner of the mounting pocket 34 formed by the other side wall 34b and the back wall 34c, as shown in the illustrated embodiment. The relief 38 also provides clearance for preventing the insert 14 from binding, as well as protecting the cutting edge of each insert 14 that is not being used from chipping or other damage.

Referring now to FIGS. 3–9, each pocket face 32 is adapted to receive a cutting insert, such as cutting insert 14. Specifically, each cutting insert 14 includes a back face 40 that mates with the mounting pocket 34. The mounting pocket 34 is designed for ease of manufacture to limit tolerance buildup, thereby ensuring repeatable insert positioning while maintaining accuracy and a fine cutting finish. After the insert 14 is seated or mated in the mounting pocket 34, the insert 14 is tightly secured to the mounting pocket 34 by a locking fastener 44 (shown in FIG. 1), such as an Allen or Torx screw that passes through a clearance hole 46 located in the cross hole location of the cutting insert 14 and threads into the threaded hole 36. The clearance hole 46 includes a tapered counterbore 46A, which is engaged by a corresponding tapered surface on the head of the locking fastener 44, thereby allowing the insert to be tightly secured to the pocket face 32 as the locating fastener 44 pushes downward against the tapered counterbore 46A. The location of the clearance hole 46 in the cross hole location of the cutting insert 14 allows an unobstructed cutting face and a larger diameter center core in the cutter body 12, thereby creating maximum strength and allowing longer cutting lengths.

As described above and in accordance with one of the features of the invention, the inserts in adjacent groupings are staggered, that is in any given cross sectional plane through the shank 16, the inserts on a grouping 48 overlap and preferably start and end in the mid-section of one of the inserts in an adjacent grouping 49, as is best shown by the inserts toward the end face 20 in FIG. 1. As shown in the illustrated embodiment, there is a one-to-one correspondence between the number of groupings and the number of flute areas. Although the staggering may be any overlap, it is preferable that the midpoint of any given insert is substantially centered between the inserts in the adjacent helical grouping as this configuration provides a continuous cut for the best peak shaving on the milled surface. The measurement of effective flute areas or flutes can be determined by how many flutes need to pass in order to cut one complete profile on the workpiece. Because the groupings 48, 49, 50 overlap in the manner described above, two flutes (or groupings of inserts) are needed to cut one profile. Thus, in the illustrated embodiment, the six groupings or flute areas define a three effective flute cutter system.

As shown the illustrated embodiment of FIGS. 3–9, the cutting insert 14 is approximately diamond in general shape and includes a front face or top surface 52, a pair of opposed side walls or surfaces 54 and 56, another pair of opposed side walls or surfaces 58 and 60, the base surface or back face 40. The top surface 52 includes a substantially flat central portion 52a, a first curved facet surface 52b, and a second curved facet surface 52c located on the opposite side of the central portion 52a. The side wall 58 includes a first substantially flat faceted surface 58a, and a second substantially flat faceted surface 58b having a smaller surface area than the faceted surface 58a. Similarly, the opposite side wall 60 includes a first substantially flat faceted surface 60a, and a second substantially flat faceted surface 60b having a smaller surface area than the faceted surface 60a. The other two side walls 54 and 56, and the back surface 40 are substantially flat.

Figure 3:
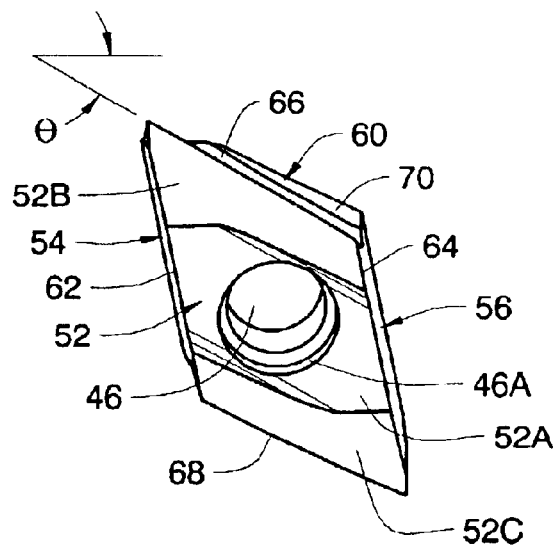
FIG. 3 is a top perspective view of an improved cutting insert according to an embodiment of the invention.
Figure 4:
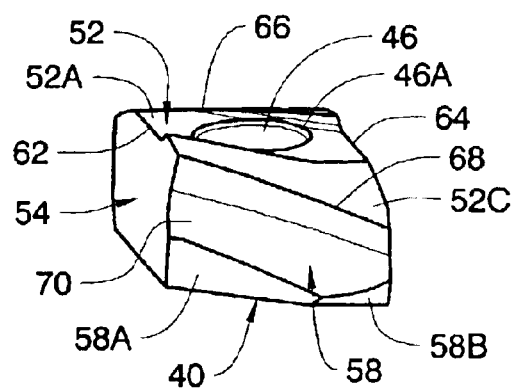
FIG. 4 is a side perspective view of the cutting insert of FIG. 3.
Figure 9:
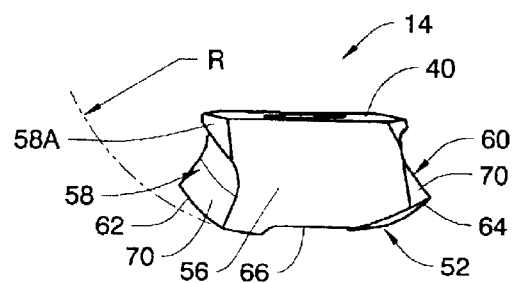
FIG. 9 is a another side perspective view of the cutting insert of FIG. 3.

Formed at the intersection between the top surface 52 and the side walls 54, 56, 58 and 60 are principally four edges, namely a pair of opposed and spaced apart edges 62 and 64, and another pair of opposed and spaced apart edges 66 and 68. At least one of the edges 62, 64, 66 and 68 is a cutting edge, and preferably at least the two opposite edges 66 and 68 are cutting edges, thereby allowing the insert to be indexable by rotating the cutting insert by approximately 180 degrees. The edges 66 and 68 preferably form an angle, $\theta$, of approximately 30° with the central, longitudinal axis of the cutter body 12 (along the z-axis) to cut a true 30° helix about the cutting diameter of the cutter 10, as best shown in FIG. 3. Although only the edge 66 is shown in FIG. 3 to have an angle of approximately 30°, it should be realized that cutting edge 68 is substantially parallel to cutting edge 66, and thus will also have an angle of approximately 30°. It will be appreciated that the invention is not limited by the angle of the cutting edges, but the invention can be practiced with any desirable angle for the cutting edges. For example, other shapes of inserts are contemplated that include helical cuts in the side walls 66 and 68 with an angle, $\theta$, for the helix that ranges between 0° and 60°.

In accordance with one of the features of the invention, a helical cut face 70 is formed in two opposite side surfaces 58 and 60 to form a side face helix that creates a smooth cutting action as a solid helical end mill, unlike conventional inserts. In addition, the helical cut face 70 on the opposite side surfaces 58 and 60 allows the cutting insert 14 to be indexable on two sides by rotating the cutting insert 14 approximately 180 degrees. High positive radial and axial rake angles enable free cutting machining with a fine finish and low horsepower consumption.

Figure 6:
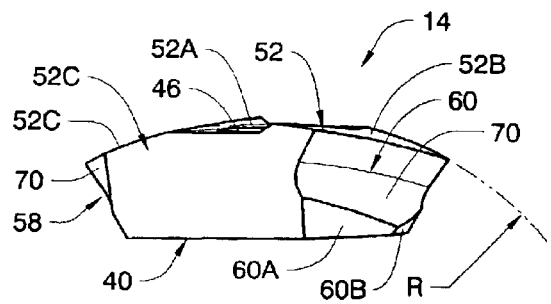
FIG. 6 is another side perspective view of the cutting insert of FIG. 3.
Figure 5:
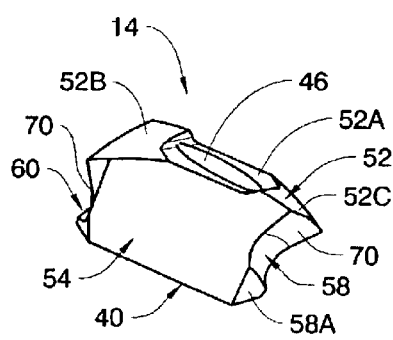
FIG. 5 is another side perspective view of the cutting insert of FIG. 3.
Figure 7:
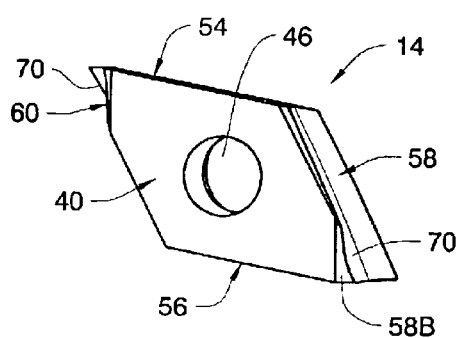
FIG. 7 is a perspective view of the bottom of the cutting insert of FIG. 3.
Figure 10:
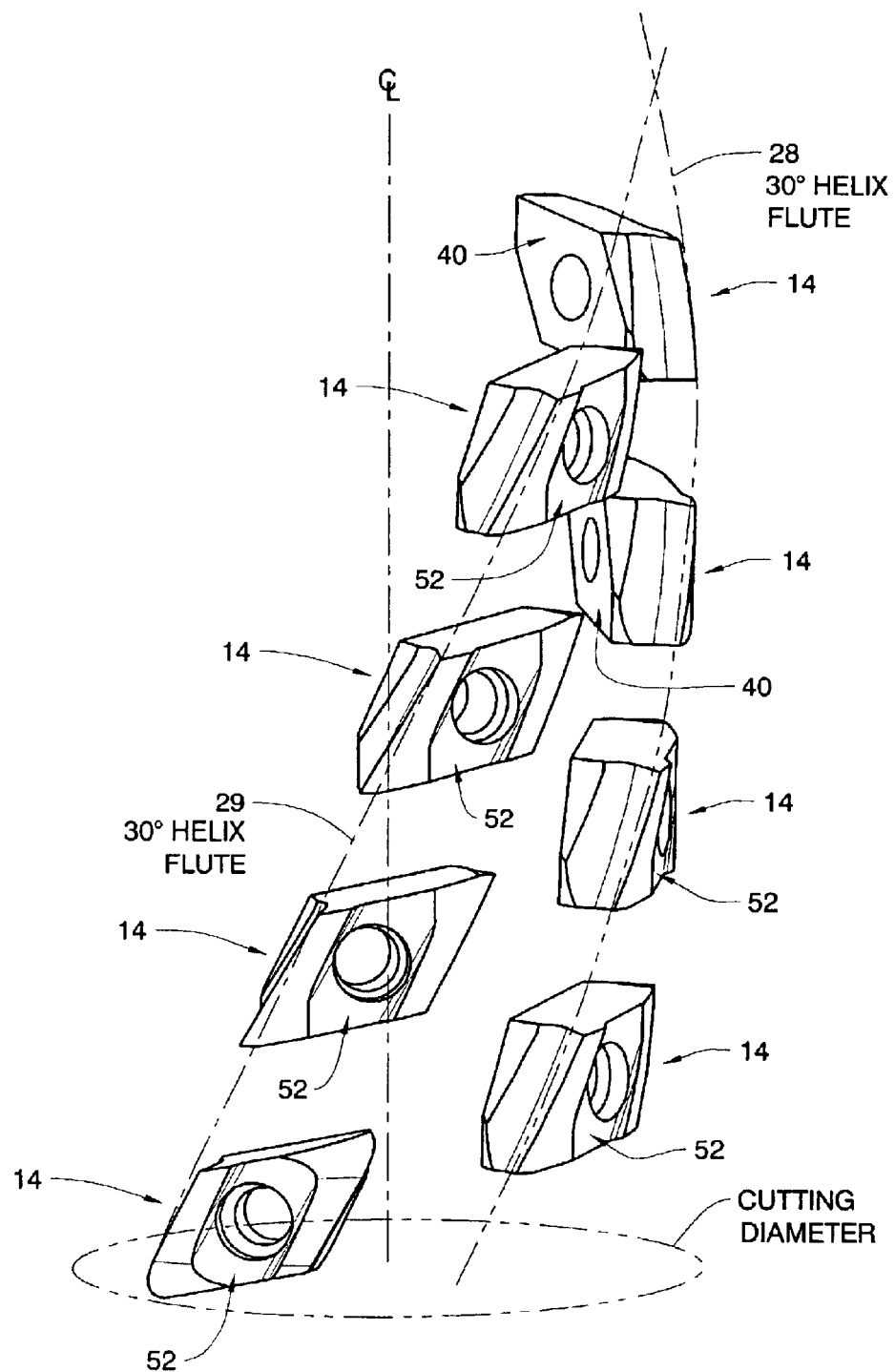
FIG. 10 is a diagram showing the true helix of the cutting inserts of the invention.

In accordance with another of feature of the invention, the top surface 52 of the insert 14, and in particular the curved facet surfaces 52b and 52c form a rounded or radiused top surface having a radius of curvature, R, as best shown in FIG. 6. Preferably, the radius of curvature, R, is approximately equal to a cutting diameter of the milling body as shown in FIG. 10. Because of the radius of curvature, R, the top surface 52 follows the curvature of the outer surface of the head 18 to provide a true helical cutting insert that follows the curvature of the outer surface of the head 18, unlike conventional inserts with front faces or surfaces that are substantially flat.

Figure 11:
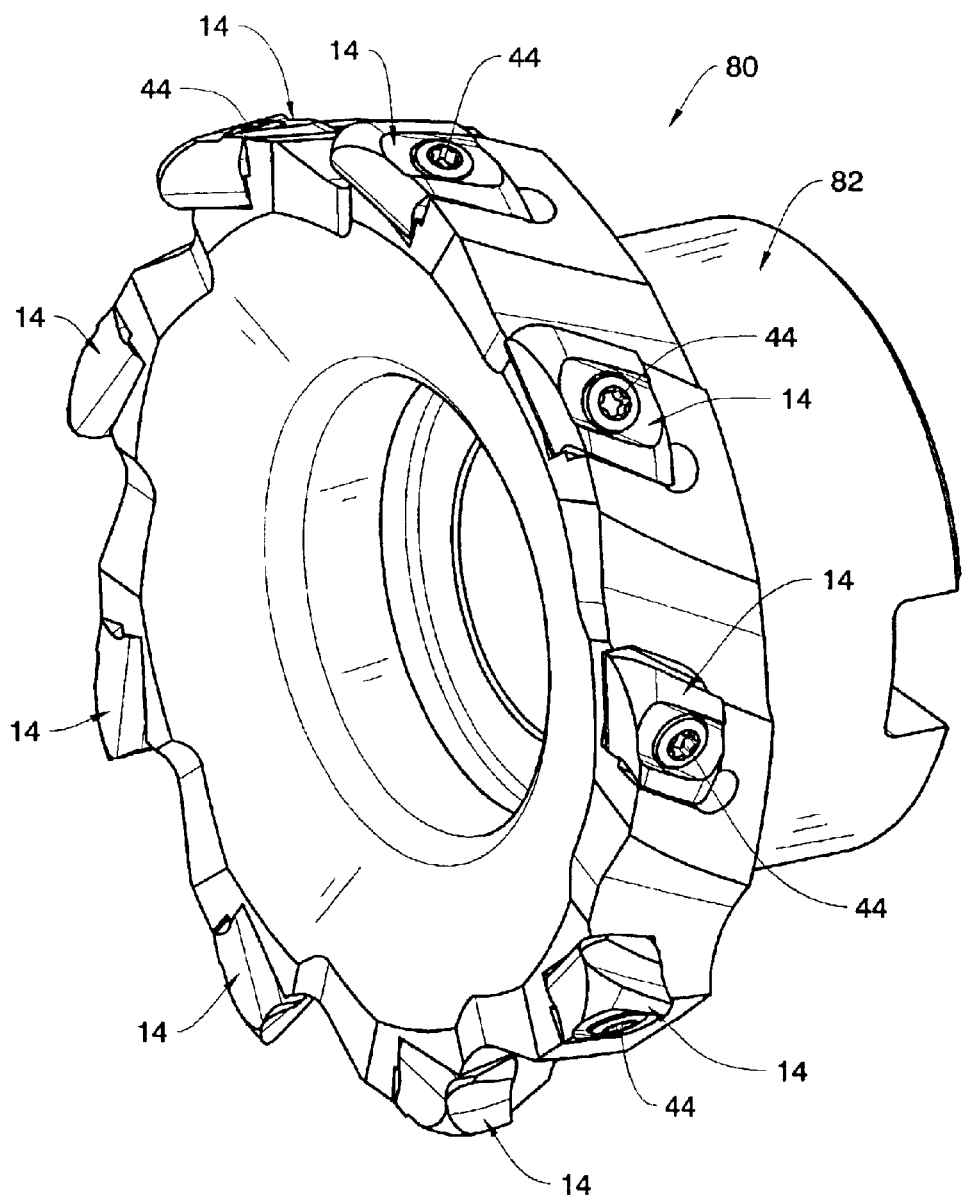
FIG. 11 is a side perspective view of a helical shell end mill cutter body with the improved cutting inserts of the invention.
Figure 12:
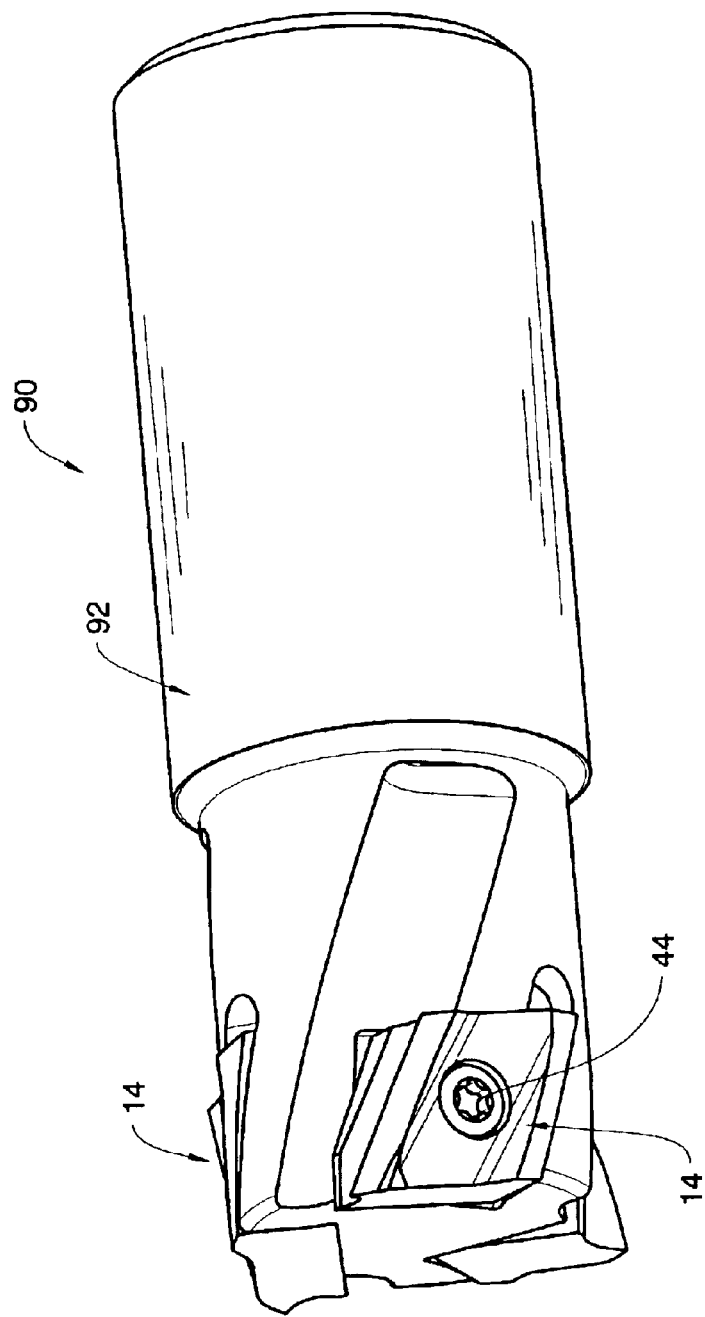
FIG. 12 is a side perspective view of another end mill cutter body with the improved cutting inserts of invention.

It will be appreciated that the indexable cutting insert 14 of the present invention is not limited to the type of cutter body 12, and that the invention can be practiced with other types of cutter body designs. For example, the indexable cutting insert 14 of the present invention can be utilized in a cutter system 80 that includes a shell end mill type of cutter body, shown generally at 82 in FIG. 10. In another example, the indexable cutting insert 14 of the present invention can be utilized in a cutter system 90 that includes another type of end mill cutter body, commonly known as a "router," shown generally at 92 in FIG. 11.

As described above, the cutter system 10 of the invention is designed to create a continuous true helical cut. In addition, the cutter system 10 of the invention provides an indexable helical insert that is indexable on at least two cutting edges by rotating the insert 180 degrees. Thus, the cutter system 10 of the invention provides for a more cost-effective cutter system because indexing the insert maintains cutting diameter and edges, unlike scrapping the entire cutter when the insert is worn or broken in a conventional solid endmill design.

While the invention has been specifically described in connection with certain specific embodiments thereof, it is to be understood that this is by way of illustration and not of limitation, and the scope of the appended claims should be construed as broadly as the prior art will permit.

What is claimed is:

1. A cutter system, comprising:
    a milling body having a plurality of mounting pockets; and
    a plurality of indexable cutting inserts mounted to the mounting pockets of said milling body to form at least one helical grouping, at least one cutting insert including a front face having a helically radiused curvature, a substantially planar back faces, and at least two opposing side walls that each include a helical cut face with respect to a central, longitudinal axis of the milling body, wherein a helical cutting edge is defined at an intersection between said front face and the combination of one of said at least two opposing side walls.

2. The cutter system of claim 1, wherein at least one insert is generally diamond in shape.

3. The cutter system of claim 2, wherein said at least two opposing side walls has an angle in a range of approximately 0 to 60 degrees with respect to a central axis of the cutter body.

4. The cutter system of claim 3, wherein the angle is approximately 30 degrees.

5. The cutter system of claim 1, wherein the milling body comprises an endmill cutter body.

6. The cutter system of claim 1, wherein the milling body comprises a shellmill cutter body.

7. A cutter system, comprising:
    a cutter body having a plurality of helical groupings, each helical grouping having a plurality of mounting pockets; and
    a plurality of indexable cutting inserts mounted to the mounting pockets of said milling body, at least one cutting insert including a front face having a helically radiused curvature, a substantially planar back face, at least two opposing side walls that each include a helical cut face with respect to a central, longitudinal axis of the milling body, wherein a helical cutting edge is defined at an intersection between said front face and said at least two opposing side walls.

8. The cutter system of claim 7, wherein at least one insert is generally diamond in shape.

9. The cutter system of claim 8, wherein said at least two opposing side walls has an angle in a range of approximately 0 to 60 degrees with respect to a central axis of the cutter body.

10. The cutter system of claim 9, wherein the angle is approximately 30 degrees.

11. An indexable insert for a cutter system, comprising:
    a front face having a helically radiused curvature;
    a substantially planar back face;
    at least two opposing side walls that each include a helical cut face with respect to a central, longitudinal axis of the insert; and
    wherein a helical cutting edge is defined at an intersection between said front face and said at least two opposing side walls.

12. The cutting insert of claim 11, wherein the cutting insert is generally diamond in shape.

13. The cutting insert of claim 12, wherein said at least two opposing side walls has an angle in a range of approximately 0 to 60 degrees with respect to a central axis of the cutter body.

14. The cutting insert of claim 13, wherein the angle is approximately 30 degrees.

15. The cutting insert of claim 11, wherein the cutting insert is mounted to a mounting pocket of the cutter body.

16. The cutting insert of claim 15, wherein the cutting insert is mounted to the mounting pocket using a three-point mourning system.

* * * * *